(12) United States Patent
Mohagheghi et al.

(10) Patent No.: US 10,310,495 B2
(45) Date of Patent: Jun. 4, 2019

(54) SYSTEMS AND METHODS FOR MONITORING AUTOMATION SYSTEMS

(75) Inventors: Salman Mohagheghi, Denver, CO (US); Jean-Charles Tournier, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 506 days.

(21) Appl. No.: 13/009,375

(22) Filed: Jan. 19, 2011

(65) Prior Publication Data

US 2012/0023058 A1 Jan. 26, 2012

Related U.S. Application Data

(60) Provisional application No. 61/367,415, filed on Jul. 24, 2010.

(51) Int. Cl.
*G05B 23/02* (2006.01)
*G06N 5/04* (2006.01)

(52) U.S. Cl.
CPC ......... *G05B 23/0278* (2013.01); *G06N 5/048* (2013.01)

(58) Field of Classification Search
CPC .................................................. G05B 23/0278
See application file for complete search history.

(56) References Cited

U.S. PATENT DOCUMENTS

| | | | |
|---|---|---|---|
| 7,251,570 B2 | 7/2007 | Hancock et al. | |
| 7,558,703 B2 | 7/2009 | Stoupis et al. | |
| 7,580,903 B2 | 8/2009 | Marczyk | |
| 7,706,596 B2 | 4/2010 | Garvey | |
| 2002/0152185 A1* | 10/2002 | Satish Jamadagni | |
| 2006/0074819 A1 | 4/2006 | Marczyk | |

FOREIGN PATENT DOCUMENTS

CN 102346437 A 2/2012

OTHER PUBLICATIONS

Enrique Pelaez, C., and John B. Bowles. "Using fuzzy cognitive maps as a system model for failure modes and effects analysis." Information Sciences 88.1 (1996): 177-199.*
Brunner, Christoph. "IEC 61850 for power system communication." Transmission and Distribution Conference and Exposition, 2008. T&D. IEEE/PES. IEEE, 2008.*

(Continued)

*Primary Examiner* — Li B. Zhen
*Assistant Examiner* — Daniel T Pellett
(74) *Attorney, Agent, or Firm* — Taft Stettinius & Hollister LLP; J. Bruce Schelkopf

(57) ABSTRACT

Systems and methods are disclosed for monitoring operation of an automation system that includes a plurality of interconnected logical objects. The systems and methods may build a fuzzy cognitive map to model an interdependence of the plurality of interconnected logical objects upon one another. In some examples, the systems and methods may identify a non-ideality associated with at least one of the plurality of logical objects and determine from the fuzzy cognitive map an effect of the non-ideality on the operation of the automation system. In some examples, the systems and methods may determine from the fuzzy cognitive map a first one of the plurality of logical objects that affects a second one of the plurality of logical objects to a greater extent than do the remaining ones of the plurality of logical objects.

23 Claims, 5 Drawing Sheets

(56) References Cited

OTHER PUBLICATIONS

Xin, Jianbo, Zhiwei Liao, and Fushuan Wen. "Intelligent alarm processing and fault diagnosis in digital substations." Power System Technology (POWERCON), 2010 International Conference on. IEEE, 2010.*
Kottas, Theodore L., Yiannis S. Boutalis, and Manolis A. Christodoulou. "A new method for weight updating in fuzzy cognitive maps using system feedback." ICINCO. 2005.*
Aizpurua, O., R. Galan, and A. Jimenez. "A new cognitive-based massive alarm management system in electrical power administration." Devices, Circuits and Systems, 2008. ICCDCS 2008. 7th International Caribbean Conference on. IEEE, 2008.*
Kottas, Theodoros L., Yiannis S. Boutalis, and Athanassios D. Karlis. "New maximum power point tracker for PV arrays using fuzzy controller in close cooperation with fuzzy cognitive networks." Energy Conversion, IEEE Transactions on 21.3 (2006): 793-803.*
Papageorgiou, Elpiniki, Chrysostomos Stylios, and Peter Groumpos. "Fuzzy cognitive map learning based on nonlinear Hebbian rule." AI 2003: Advances in Artificial Intelligence. Springer Berlin Heidelberg, 2003. 256-268.*
Kottas et al. "A new method for weight updating in fuzzy cognitive maps using system feedback." In ICINCO, pp. 202-209. 2005.*
Brunner, Christoph. "IEC 61850 for power system communication." In Transmission and Distribution Conference and Exposition, 2008. T&D. IEEE/PES, pp. 1-6. IEEE, 2008.*
IEC 61850-5, "Communication networks and systems in substations—Part 5: Communication requirements for functions and device models", 2003.*
Salman Mohagheghi, A Fuzzy Cognitive Map for Health Assessment of IEC 61850 Based Devices and Functions, presented at Georgia Tech Fault and Disturbance Conference. Atlanta, GA, May 2010.
Jianqing Zhang and Carl A. Gunter, IEC 61850—Communication Networks and Systems in Substations: An Overview of Computer Science, document posted Jul. 2009, Illinois Security Lab, University of Illinois at Urbana-Champaign.
Wikipedia, IEC 61850, http://en.wikipedia.org/wiki/IEC_61850, printed Jul. 12, 2010.
Klaus-Peter Brand, IEC 61650 Short Tutorial, 2005.
L. Andersson, C. Brunner and F. Engler, Substation Automation Based on IEC 61850 with New Process-Close Technologies, In Proc. IEEE Power Tech. Bologna, Italy, Jun. 2003.
Sisco, "IEC 61550—A New Approach to Substation Automation,Communications, and Integration," 2008.
Ralph Mackiewicz, Benefits of IEC61850 Networking.
First Chinese Office Action cited in Chinese Application No. 201110058914.X dated Jan. 15, 2015, 15 pgs.
"Using Fuzzy Dognitive Maps as a System Model for Failure Modes and Effects Analysis", C. Enrique Pelaez and John B. Sowles, 1996, Information Sciences, Elsevier Science Inc., 23 pgs.
"IEC 61850 for Power System Communication", Christoph Brunner, 2008, IEEE, Transmission and Distribution Conference and Exposition, 6 pgs.
"Virtual Peach Model Based on Fuzzy Cognitive Map", Wang Yu-Jie, Zhu Xiao-Dong, Tang Jian and Lian Shi-Bin, Oct. 2007, Journal of Beijing University of Agriculture, vol. 22, No. 4, 5 pgs.
"Benefits of IEC61850 Networking", Ralph Mackiewicz, May 2006, reprinted from the Internet at: http://www.sisconet.com/downloads/Benefits%20of%20IEC61850.pdf, 27 pgs.

* cited by examiner

SYSTEMS AND METHODS FOR MONITORING AUTOMATION SYSTEMS

CROSS REFERENCE TO RELATED APPLICATION(S)

This application claims the benefit of U.S. Provisional Patent Application Ser. No. 61/367,415, which was filed on Jul. 24, 2010 and is entitled "Systems and Methods for Monitoring Automation Systems." The complete disclosure of the above-identified patent application is hereby incorporated by reference for all purposes.

FIELD OF THE DISCLOSURE

The present disclosure relates to monitoring automation systems, and more particularly to monitoring electrical power substation automation systems, distribution automation systems, feeder automation systems, as well as other similarly configured automation systems.

BACKGROUND

Automation systems may rely on the large amounts of data that may be gathered from across the automated system. Accordingly, efficient, proper and effective performance of the automation system may depend on the validity and accuracy of the data. However, many automation systems include an interconnected network of measurements and operational data, where data belonging to one data set may affect the other data sets. In such automation systems, the large number of data points and the highly meshed information network may make it difficult for an operator to supervise and assess the data. Accordingly, systems and methods for monitoring the automation system may be needed to assist the operator, such as by validating the data and verifying its accuracy.

Automation systems and/or the corresponding automated system may be designed and/or operated based on one or more standards or protocols. For example, in the context of substation automation, the substation may be designed and operated in compliance with a protocol or standard such as Modbus, DNP3, IEC 60870-5, or even IEC 61850. The IEC 61850 standard is a standard for the design of electrical substation automation that was established by the International Electrotechnical Commission (IEC), which is located in Geneva, Switzerland and maintains a website at http://www.iec.ch.

A method and an apparatus for automating an inspection procedure are disclosed in U.S. Pat. No. 7,706,596. A process for the creation of fuzzy cognitive maps is disclosed in U.S. Pat. No. 7,580,903. Examples of electrical substation monitoring and diagnostics are disclosed in U.S. Pat. No. 7,558,703. Systems and methods for ensuring data integrity in a mesh network are disclosed in U.S. Pat. No. 7,251,570. The disclosures of these and all other publications referenced herein are incorporated by reference in their entirety for all purposes.

SUMMARY

In some examples, a method for monitoring operation of an automation system that includes a plurality of interconnected logical objects may include building a fuzzy cognitive map to model an interdependence of the plurality of interconnected logical objects upon one another, identifying a non-ideality associated with at least one of the plurality of interconnected logical objects, and determining from the fuzzy cognitive map an effect of the non-ideality on the operation of the automation system.

In some examples, a monitoring system for an automation system that includes a plurality of interconnected logical objects may include a computer and a computer readable storage medium. The computer may be linked to the plurality of interconnected logical objects. The computer readable storage medium may contain instructions configured to cause the computer to monitor operation of the automation system upon execution of the instructions. The instructions may include instructions to build a fuzzy cognitive map to model an interdependence of the plurality of interconnected logical objects upon one another, instructions to identify a non-ideality associated with at least one of the plurality of interconnected logical objects, and instructions to determine from the fuzzy cognitive map an effect of the non-ideality on the operation of the automation system.

In some examples, a method for monitoring operation of an automation system that includes a plurality of interconnected logical objects may include building a fuzzy cognitive map to model an interdependence of the plurality of interconnected logical objects upon one another, selecting a first one of the plurality of interconnected logical objects, and determining from the fuzzy cognitive map a second one of the plurality of interconnected logical objects. The second one of the plurality of interconnected logical objects may affect the first one of the plurality of interconnected logical objects to a greater extent than do the remaining ones of the plurality of interconnected logical objects.

In some examples, a tangible computer readable storage medium may contain instructions which, when executed by a computer, cause the computer to carry out a method for monitoring operation of an automation system that includes a plurality of interconnected logical objects. The method may include building a fuzzy cognitive map to model an interdependence of the plurality of interconnected logical objects upon one another, identifying a non-ideality associated with at least one of the plurality of interconnected logical objects, and determining from the fuzzy cognitive map an effect of the non-ideality on the operation of the automation system.

DETAILED DESCRIPTION

For purposes of illustration, and by way of example, portions of the systems and methods illustrated in the present disclosure are presented in the context of generic electrical power substation automation (SA) systems and components thereof, which may be in compliance with IEC 61850. Although the systems and methods disclosed herein are applicable to SA systems, including those in compliance with IEC 61850, it should be understood that the systems and methods disclosed herein may also be applicable to other larger and/or more complex systems, such as electrical power distribution automation systems and electrical power feeder automation systems, as well as any other automation systems that include, or are amenable to, an object-oriented-based communication protocol and/or are amenable to an object-oriented model of how devices look to, and behave, in a network structure.

An automation system may include various functions that utilize data available from across the automated system or from other functions within the automated system. For example, an SA system may include many functions that utilize data available from across the substation or from other functions within the substation. In a substation designed and operating based on IEC 61850, some or all of the various control, protection, monitoring and measurement applications or functions may be broken down into and modeled by one or more interconnected logical nodes, which are the virtual units or logical objects defined in the object-oriented context of the IEC 61850 standard.

Figure 1:
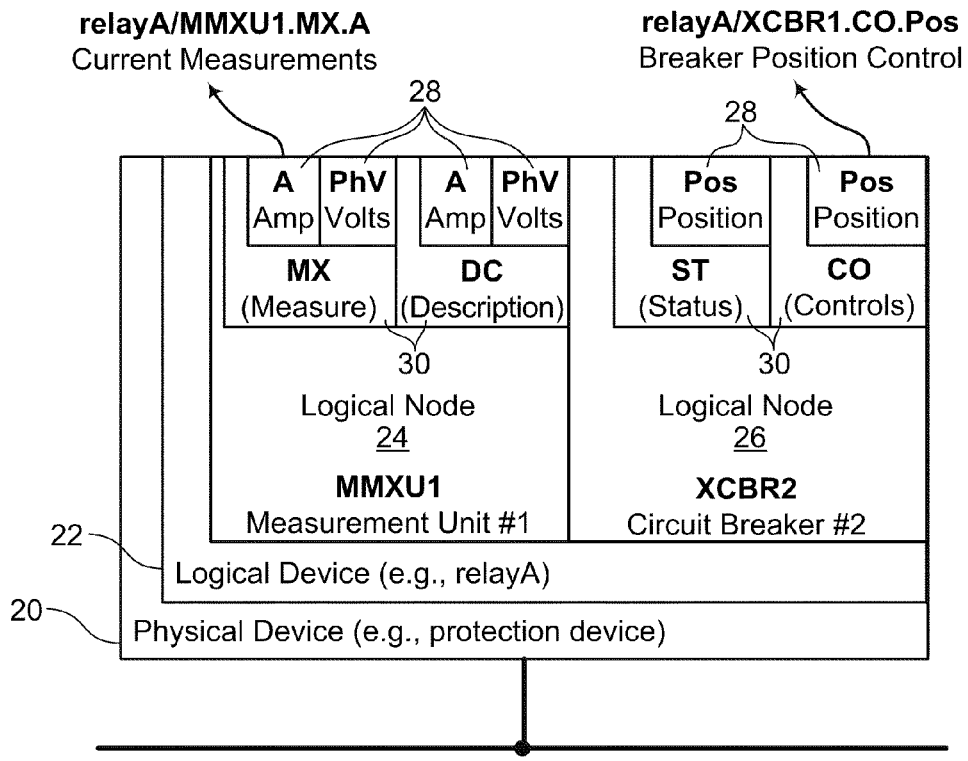
FIG. 1 is a schematic illustration of a device model under IEC 61850.

Such a breakdown into one or more interconnected logical objects or nodes is schematically illustrated in FIG. 1, where an identified physical device 20, a protection device in this example, is broken down for modeling purposes into at least one logical device 22, "relayA," which is itself broken down into at least one logical object or node. In the illustrated example, the logical device 22 has been broken down into logical nodes 24, 26, which correspond, respectively, to a measurement unit, MMXU1, and a circuit breaker, XCBR2. In general, logical objects or nodes may be freely allocated onto any intelligent electronic device (IED) during the breakdown as long as the communication paths between the logical nodes can be mapped to existing physical communication links that have sufficient communication and/or computational capacity.

When creating the model of a protection function, all functions desired for the automation application may need to be associated or identified with their tasks and starting criteria, and expected output and performance criteria may need to be defined. Such functions, which may include protection, control, measurement and monitoring, may then be decomposed into logical objects such as the logical devices and logical nodes set out in IEC 61850.

Figure 2:
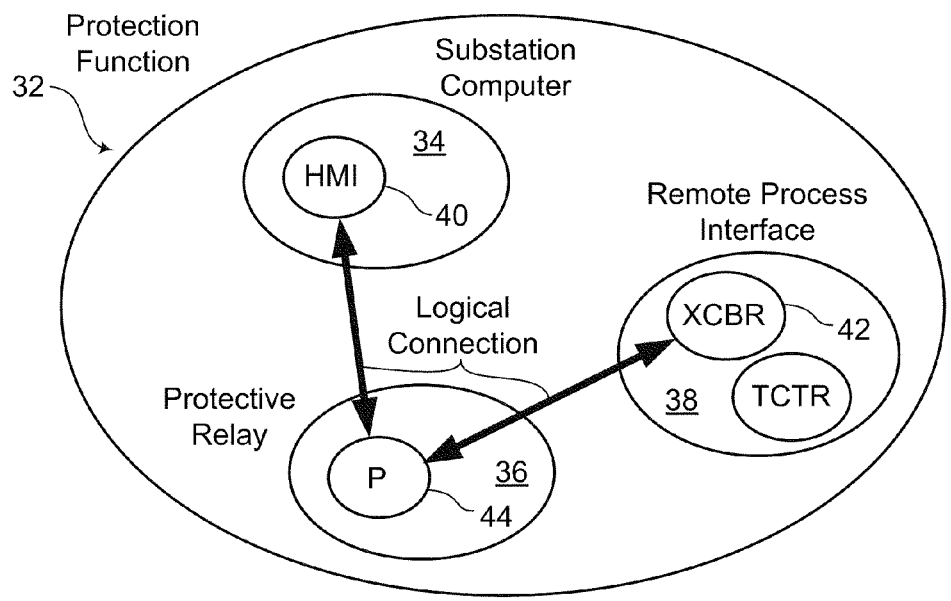
FIG. 2 illustrates a protection function that has been modeled as a plurality of interconnected logical nodes.

By way of example, a model of a protection function 32 that includes several physical devices is shown in FIG. 2. The illustrated protection function 32 includes three physical devices, namely, a substation computer, a protective relay and a remote process interface, which correspond, respectively, to logical devices 34, 36, 38. In the illustrated example, the three logical nodes reside in three different physical devices, with the human-machine interface (HMI) 40 residing in the substation computer, the circuit breaker (XCBR) 42 residing in the remote process interface, and the protection function (P) 44 residing in the protective relay. In some examples, each physical device, such as an IED, can host one or more logical nodes and one or more logical devices, and each logical device can host one or more logical nodes.

In general, each of the logical objects may include data, data objects, data attributes and/or functions. In the context of IEC 61850, each of the logical nodes may include data objects, data-set objects, descriptive data attributes, report control objects, log-control objects, and a list of sampled values. The type of data contained in a particular logical node may depend on the type of the node and may include operational data, such as measurement values or position status, and/or configuration data, such as self-descriptive data for an IED. For example, in the model shown in FIG. 1, the logical nodes 24, 26 each include several data objects 28, each of which would have data attributes, with each of the data objects 28 being within a particular attribute category 30.

Figure 3:
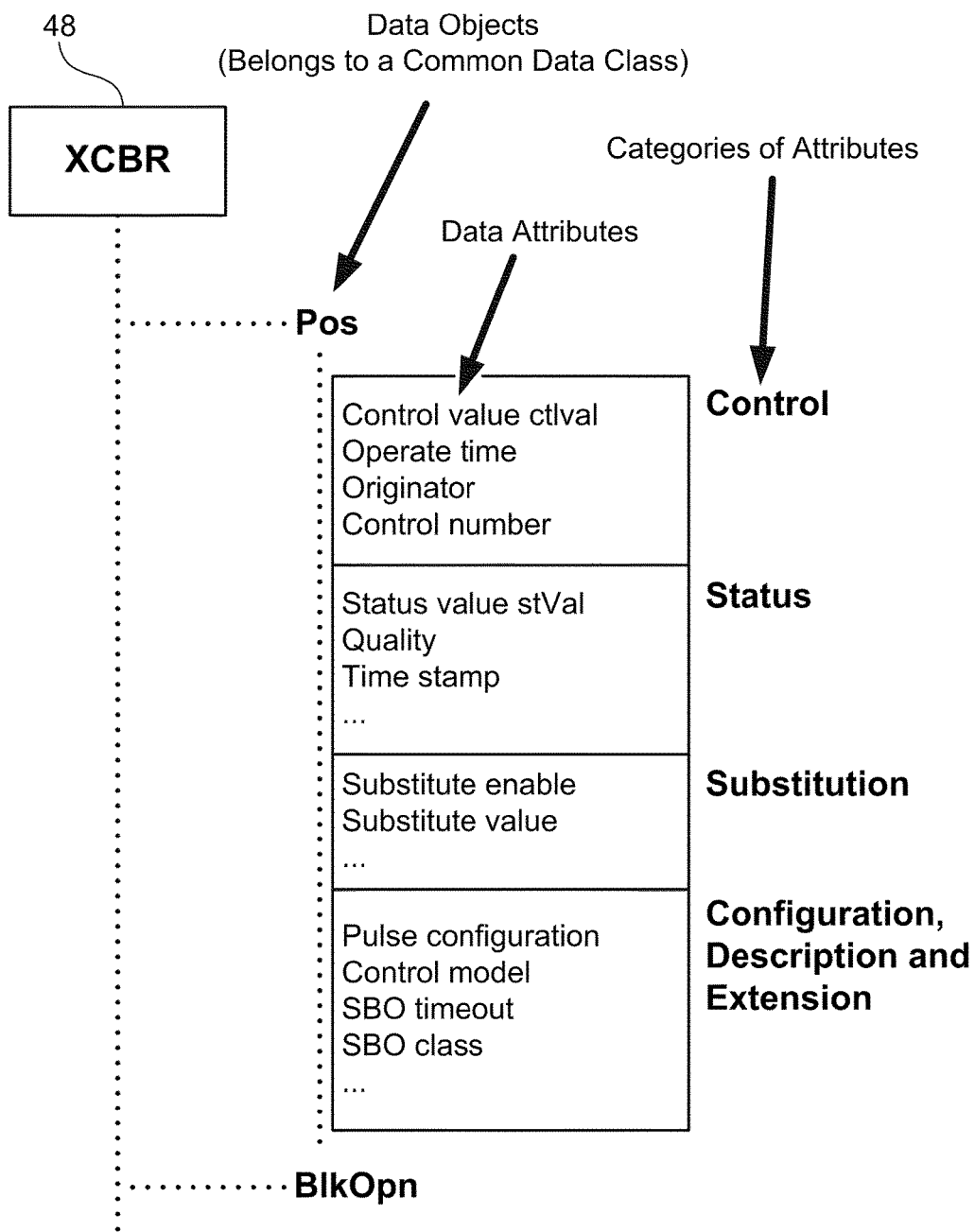
FIG. 3 shows the hierarchical structure of an illustrative logical node under IEC 61850

The general structure of a logical node is shown in FIG. 3, which illustrates the hierarchical structure of a logical node 48, identified as "XCBR," for a circuit breaker. As shown, the XCBR logical node may include several data objects, which are identified as "Pos" and "BlkOpn," with the "Pos" data object being illustrated with several identified data attributes, which are grouped into several categories of attributes.

As shown in FIGS. 1 and 3, each logical node may include one or more data objects. The data objects may belong to various categories such as common data information (e.g., mode, health, and nameplate), status info, settings, measured values and controls. In some examples, each data object may be derived from a Common Data Class (CDC) that may serve as predefined building blocks for creating larger data objects. In addition, each data object may have several data attributes associated with it. The data attributes may provide the user with additional information regarding the type of the data object, its range, the quality, a timestamp, or the like.

Each logical object or node may have a health status or attribute associated therewith. The health attribute may determine and/or indicate the state of the logical object and/or the corresponding physical device. For example, IEC 61850 defines health attributes for the logical nodes and the external devices connected to them, which include "Health," "EEHealth," and "PhyHealth." The attribute Health includes information that reflects the state of the logical node related to hardware or software, which may be a mandatory data inherited by all logical nodes within the substation. The attribute Health provides three states: Ok (green), which indicates normal operation with no problems; Warning (yellow), which indicates minor problems, but in safe operation mode; and Alarm (red), which indicates a severe problem with no operation possible. The attribute "EEHealth" includes information that reflects the state of external equipment associated with the logical node, such as a circuit breaker controlled by the logical node XCBR, which identifies a circuit breaker. The attribute EEHealth may be optional and has the same states as the attribute Health. The attribute "PhyHealth" may be a mandatory attribute that refers to the health state of the physical device. In some examples, other health attributes may be available for a particular automation system or automated system.

The data objects may have quality attributes associated therewith. The quality attributes may identify any non-ideal condition of the corresponding data objects. For example, IEC 61850 defines data quality attributes for the data objects contained in the logical nodes, which include "Validity" and "Detail Quality." The attribute Validity may include mandatory information that reflects the quality of the data object, such as whether it is valid (e.g., no abnormal condition), invalid (e.g., an abnormal condition of the acquisition function or the information source), or questionable (e.g., a supervision function detects an abnormal behavior, however the value could still be valid). The attribute Detail Quality may provides further information on the reason for an invalid or questionable value of an attribute, and may include several identifiers: Overflow, Out of Range, Bad Reference, Oscillatory, Failure, Old Data, Inconsistent, and Inaccurate. In some examples, other quality attributes may be available for a particular automation system or automated system. For example, IEC 61850 further defines the attributes "Test" and "Blocked by Operator." The attribute Test may classify a value as being a test that is not to be used for operational purposes. The attribute Blocked by Operator may indicate the further updating of a value by an operator.

In some examples, an automation system that includes a plurality of interconnected logical objects may include a non-ideality associated with at least one of the plurality of interconnected logical objects. As may be understood, a non-ideality associated with one of the plurality of interconnected logical objects may impact the accuracy and/or performance of at least those parts of the automated system that directly or indirectly depend on the logical object(s) having a non-ideality.

The following paragraphs describe nonexclusive illustrative examples of methods, and portions thereof, for monitoring automation systems, as well as systems that may embody such methods, using the concepts and components discussed herein. Although the actions of the following methods may be performed in the order in which they are presented, it is within the scope of this disclosure for the described actions, either alone or in various combinations, to be performed before and/or after any of the other described actions. Methods for monitoring automation systems, which may include a plurality of interconnected logical objects, may include determining an interdependence of the plurality of interconnected logical objects upon one another, building a suitable map, such as a fuzzy cognitive map, to model the interdependence of the plurality of interconnected logical objects, identifying a non-ideality associated with at least one of the plurality of interconnected logical objects, and determining from the fuzzy cognitive map an effect of the non-ideality on the operation and/or performance of the automation system. In some examples, determining the interdependence of the plurality of interconnected logical objects upon one another may include determining the interdependence of a first one of the plurality of interconnected logical objects upon a second one of the plurality of interconnected logical objects.

Figure 4:
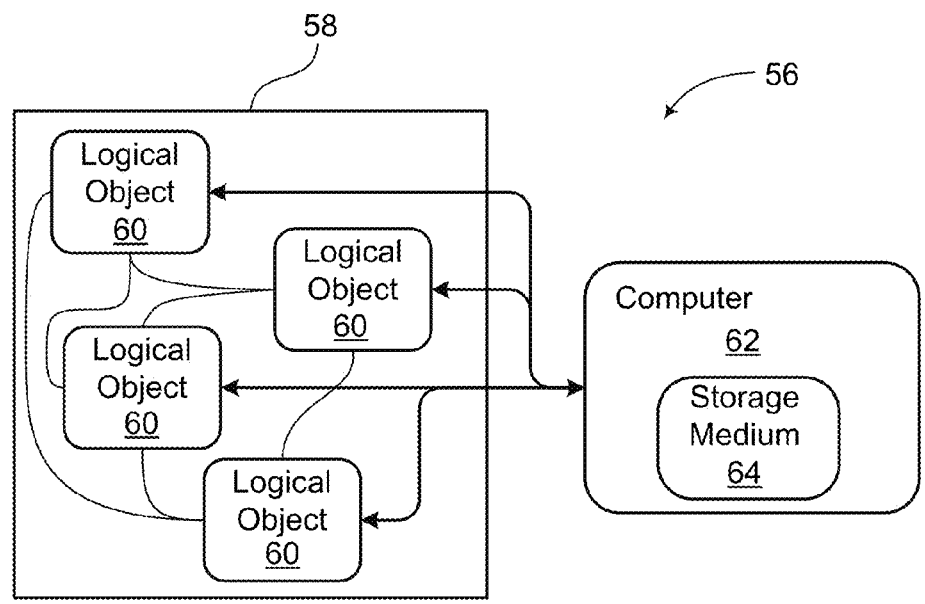
FIG. 4 is a schematic illustration of a nonexclusive illustrative example of a monitoring system for an automation system that includes a plurality of interconnected logical objects.

In some examples, such methods may be executed, or at least partially executed, by a suitable monitoring system. A nonexclusive illustrative example of a suitable monitoring system is shown schematically in FIG. 4 at 56. The monitoring system 56 may be used with an automation system 58 that includes a plurality of interconnected logical objects 60. The monitoring system 56 may include a computer 62 and a computer readable storage medium 64. The computer 62 may be linked to the plurality of interconnected logical objects 60.

In examples where the automation system 58 is a SA system, each of the plurality of interconnected logical objects 60 may correspond to a control, protection, monitoring or measurement element within the substation, each of which may include physical and/or logical devices. When used as part of a substation automation system, the computer may be located at an operator's workstation for a power substation or at a network control center for a power system, which may allow for remote monitoring and/or controlling of one or more substations. The computer readable storage medium may contain instructions configured to cause the computer to monitor operation of the automation system upon execution of the instructions. In particular, the instructions may include instructions to carry out the processes and methods disclosed herein.

Figure 5:
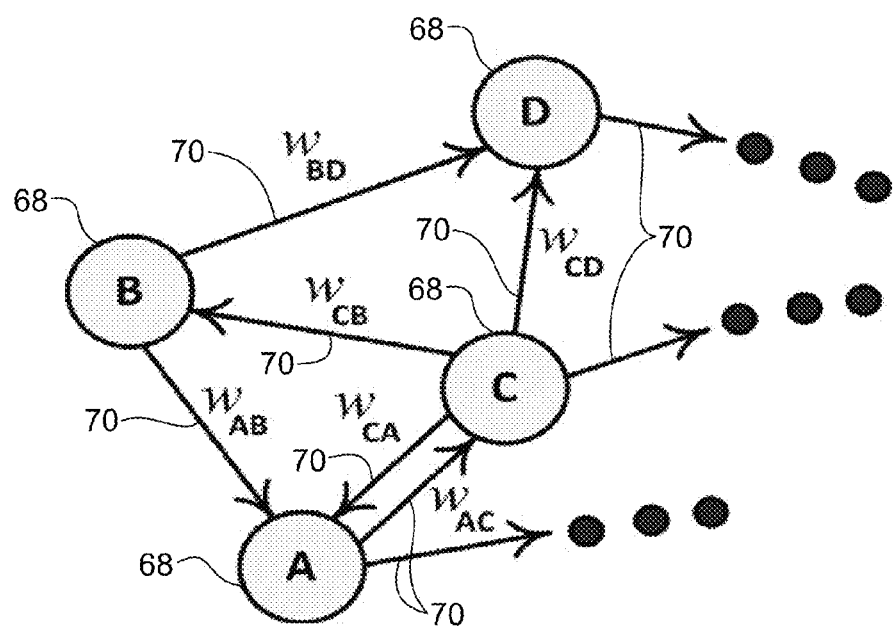
FIG. 5 is a nonexclusive illustrative example of a fuzzy cognitive map (FCM).

As noted above, a fuzzy cognitive map (FCM), such as that shown in FIG. 5, may be used to model the interdependence of a plurality of interconnected logical objects, which may be used to determine a qualitative measure for the impact of each logical object on the rest of the system. A cognitive map is a signed digraph (directional graph) with a plurality of vertices 68 that are connected by a plurality of links 70. A positive link from a vertex A to a vertex B indicates that A causally increases B, whereas a negative link from A to B means that should A happen, the chances of B happening are reduced.

An FCM additionally determines the causal effects of use cases or objects on one another. However, all of the links from one vertex to another in the FCM are weighted. This weight, "w," determines the impact of one vertex on the other. The weights of the links are fuzzy variables, denoting qualitative measures such as very high, high, medium, low, very low, and reflect the level of dependence of vertex A on B, or the impact that B has on A. The use of weights in the FCM may reduce indeterminacy problems when an FCM is used to model more complicated systems.

The effect of a vertex A on a vertex B may be determined as follows. If there are m causal paths from A to B, each consisting of $n_m$ intermediate vertices with weighted and directional links in between them, the indirect effect of A on B over a path $p_i$ can be derived as:

$$w_{AB,pi} = \min\{w_{A,j_1}, w_{j_1,j_2}, \ldots, w_{j_{nm},B}\} \quad (1)$$

where $j_k$'s denote the vertices between A and B along path $p_i$. And the total effect of A on B can also be expressed as:

$$w_{AB} = \max\{w_{AB,p_1}, \ldots, w_{AB,p_m}\} \quad (2)$$

Thus, the indirect effect of A on B amounts to specifying the weakest causal link in a path, while the total-effect operation amounts to specifying the strongest of the weakest links.

The FCM, as disclosed and applied herein, may be used to model the interrelationships between different logical objects within an automated system, as well as control/protection functions outside the automated system that make use of data from the automation system. Accordingly, each of the vertices may correspond to one of the plurality of interconnected logical objects, while the links indicate the dependency of the function contained in one vertex or logical object to the data contained in another vertex. In some examples, the direction of the dependency may be defined as going from a dependent function to the dependent-upon-data point. Typical fuzzy terms very low, low, medium, high, very high, and the like can be selected for assigning weights $w_{ij}$ to the links in order to signify the dependencies between the functions/logical objects.

In the SA context, the FCM may be used to model the interrelationships between different logical nodes within the substation and also the control/protection functions outside the substation that make use of data from the substation. Accordingly, the vertices of the FCM may correspond to the logical nodes, while the links indicate the dependency of the function contained in one vertex or logical node to the data contained in another.

Figure 6:
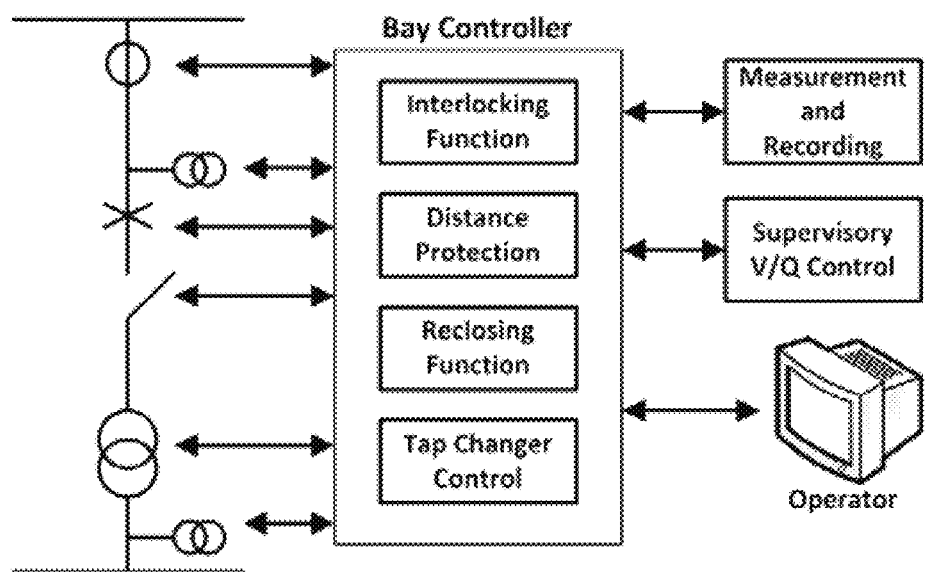
FIG. 6 is a schematic representation of a nonexclusive illustrative example of a substation suitable for use with the systems and methods for monitoring automation systems.
Figure 7:
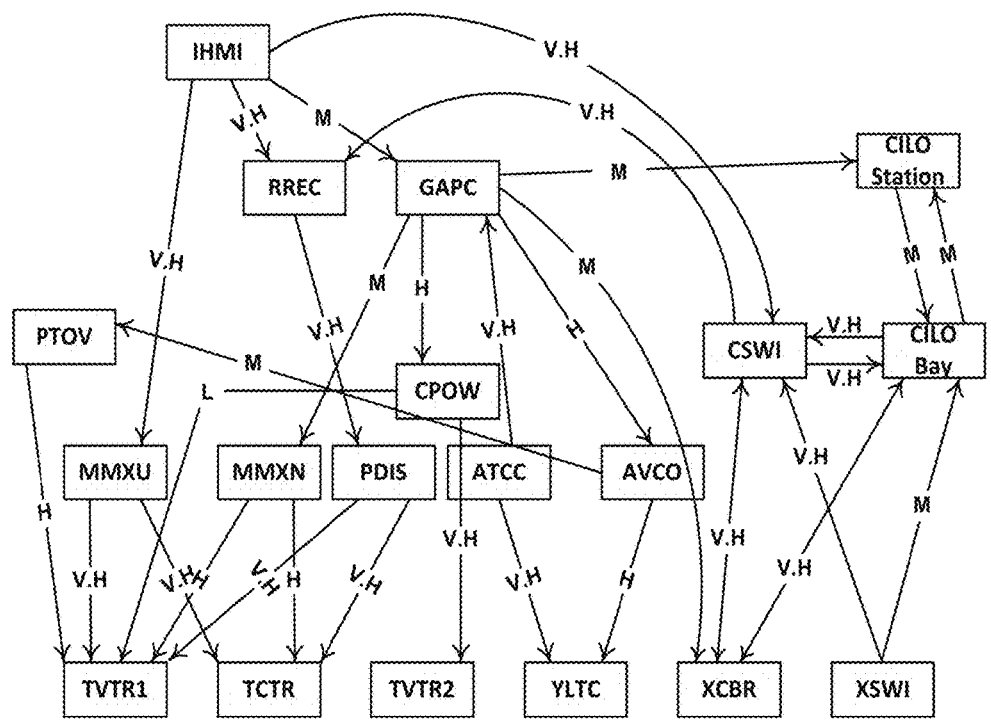
FIG. 7 is a fuzzy cognitive map of the substation of FIG. 6.

By way of a nonexclusive illustrative example, an FCM may be created for the nonexclusive illustrative example of a substation illustrated in FIG. 6. The substation shown in FIG. 6 includes a transformer bay with protection/control functions including line distance protection, tap changing functions with related protection functions, interlocking and reclosing functions, general monitoring functions, and a generic control function for regulating the transformer tap positions. An FCM from the substation of FIG. 6 is shown in FIG. 7, with the logical nodes being defined as:

ATCC: automatic tap changer control
AVCO: automatic voltage control
CILO: interlocking function at station or bay level
CPOW: point-on-wave breaker control
CSWI: switch controller for controlling any switchgear
GAPC: generic automatic process control for functions that are not predefined in the standard
IHMI: operator interface
MMXN: non-phase related measurement
MMXU: measurement
PDIS: distance protection
PTOV: overvoltage protection
RREC: automatic reclosing
TCTR: current transformer
TVTR: voltage transformer
XCBR: circuit breaker
XSWI: circuit switch (various kinds of switching devices not able to switch short circuits)
YLTC: tap changer The FCM may be developed using any suitable method. For example, expert knowledge may be used, with a substation designer/expert creating the graph of dependences/interrelations between the logical objects or nodes and then assigning qualitative weights to the links. In some examples, automated methods may be used to create the graph, as will be more fully set out below.

The weights (identified in FIG. 7 as "L" for low, "M" for medium, "H" for high, and "V.H." for very high) of the links between the vertices may be determined using any suitable method. In some examples, such as where the automated system is relatively simple, the weights may be determined heuristically. In some examples, automated methods may be used to determine the weights, as will be more fully set out below.

Figure 8:
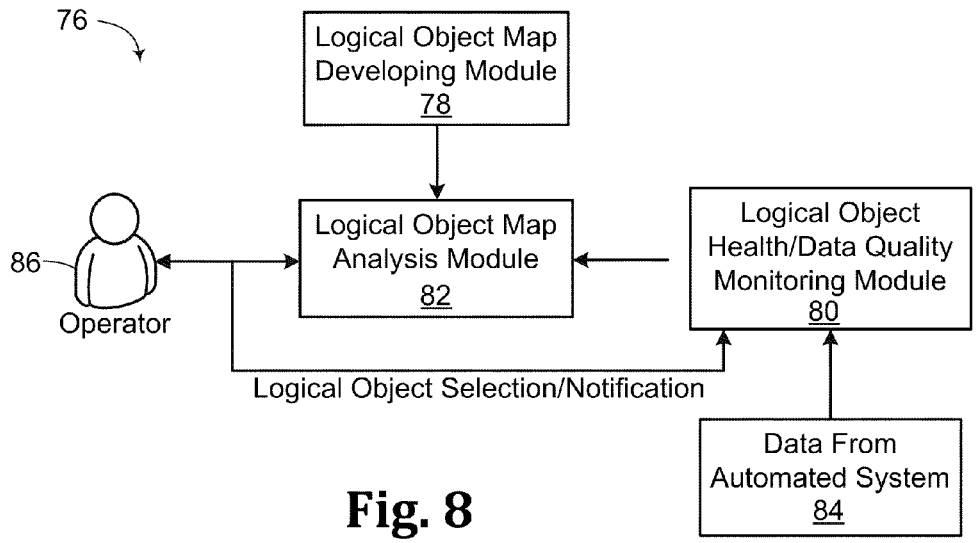
FIG. 8 is a block diagram of a nonexclusive illustrative example of a system for monitoring automation systems.

The FCM, or any other suitable logical object map, may be used to determine an effect of the non-ideality on the operation or performance of the automation system. A nonexclusive illustrative example of a system for monitoring automation systems is schematically illustrated in FIG. 8 at 76. The system 76 may include a logical object map developing module 78, a logical object health/data quality monitoring module 80, and a logical object map analysis module 82. Although system 76 includes the modules illustrated in FIG. 8, it should be understood that systems for monitoring automation systems may include additional modules and/or may omit one or more of the modules included in system 76.

The logical object map developing module 78 may develop the interdependence map of the logical objects or nodes. In some examples, the interdependence map of the logical objects or nodes may be an FCM. The interdependence map may be developed using any suitable method, including with the automated methods set out in this disclosure.

The logical object health/data quality monitoring module 80 may receive information or data 84 from the logical objects in the automated system, which may be logical nodes in SA system. The quality monitoring module 80 may evaluate the health status and data quality attributes. If a non-ideal condition is detected, the detected logical objects or nodes, as well as the type of non-ideality, may be transmitted to the operator 86 and/or to the logical object map analysis module 82. In some examples, the operator 86, or other user, may set the frequency or interval at which the quality monitoring module 80 monitors the logical objects of the automated system.

The logical object map analysis module 82 may use the interdependence map to analyze the effect of various ones of the logical objects upon the other logical objects. For example, the analysis module 82 may receive the non-ideality source and type from the quality monitoring module 80. The analysis module 82 may use the non-ideality information to analyze the impact of the non-ideality on the remainder of the monitored automation system and/or on the automated system.

The analysis module 82 may provide several analytical capabilities to the operator 86. In some examples, the quality monitoring module 80 may detect and/or identify a logical object with a non-ideality such as a non-ideal condition or non-ideal data object. The analysis module 82 may notify the operator 86 of the logical object having a non-ideality. The operator 86, or other user, may then provide the identified logical object as input to the analysis module 82. The analysis module 82 may return a list of logical objects that are affected by the identified non-ideal logical object, as well as the qualitative degree by which the listed logical objects are affected. In some examples, the operator 86 may narrow down the results such as by defining a search criterion that selects only logical objects that are affected by the identified non-ideal logical object by at least a certain qualitative degree, in which case the analysis module 82 may then return a refined list of affected logical objects.

In some examples, the operator 86 may identify or select a logical object of interest. The operator 86 may input the logical object of interest to the analysis module 82, which may identify those logical objects that affect or are affected by the logical node of interest. The analysis module 82 may return a list of identified logical objects, along with the qualitative degree by which the listed logical objects affect, or are affected by, the logical object of interest. In some examples, the operator 86 may narrow down the results such as by defining a search criterion that selects only logical objects that have at least a particular effect on the logical object of interest, or are affected by the logical node of interest by at least a predefined degree, in which case the analysis module 82 may then return a refined list of identified logical objects. In some examples, the analysis module 82 may determine which of the logical objects is most affected by the logical object of interest. In some examples, the operator may define a watch list of logical objects such that the quality monitoring module 80 may monitor the health status or data quality attributes of certain logical objects with a desired frequency.

A non-ideality associated with at least one of the plurality of interconnected logical objects may include a non-ideal health status and/or a non-ideal data quality associated with that object. As may be understood, a non-ideal health status or a non-ideal data quality associated with a logical object or node may impact the accuracy and/or performance of at least those parts of the automated system that directly or indirectly depend on the logical node having the non-ideality. In the context of an SA system, a non-ideal health status or data quality for a logical object or node may impact or diminish the accuracy and performance of the overall control/protection functions dependent on that object or node.

In some examples, a non-ideal health status for a particular logical object may indicate a non-ideal and/or problematic operational state and/or health status for a device associated with that logical object. For example, a non-ideal health status for a particular logical object may indicate a problematic operational state and/or health status for an associated physical device or software component within the automation system.

When using the system 76 to determine an effect of a non-ideal health status on the operation or performance of the automation system, the operator 86 may select a logical object having a health status (or the health status of the device connected to it) that is non-ideal. The operator may select all or a set of logical objects of interest to see the impact of the non-ideal health status on their performance. The analysis module 82 may select a first (or the next) one of the logical objects from the selected logical objects and determine all possible paths from the first (or the next) one of the logical objects to the logical object having the non-ideal health status. The analysis module 82 may determine the paths using a suitable method such as a graph theory algorithm, such as depth-first search or breadth-first search. For each of the determined paths, the indirect effect of the logical object having the non-ideal health status on the selected logical object may be calculated according to equation (1) above. The total effect of the logical object having the non-ideal health status on the selected logical object may be calculated according to equation (2) above. The qualitative value of the effect may then be reported to the operator. The analysis module 82 may select a further one of the logical objects from the selected logical objects until all selected logical objects have been considered.

A non-ideal data quality attribute associated with a particular object may indicate that the data is invalid and/or has a questionable value. When using the system 76 to determine an effect of a non-ideal data quality attribute on the operation or performance of the automation system, the operator 86 may select a non-ideal data quality attribute and determine the logical object with which the non-ideal data quality attribute is associated. The operator may select all or a set of logical objects of interest to see the impact of the non-ideal data quality attribute on their performance. The analysis module 82 may select a first (or the next) one of the logical objects from the selected logical objects and determine all possible paths from the first (or the next) one of the logical objects to the logical object having the non-ideal data quality attribute. The analysis module 82 may determine the paths using a suitable method such as a graph theory algorithm, such as depth-first search or breadth-first search. For each of the determined paths, the indirect effect of the logical object having the non-ideal data quality attribute on the selected logical object may be calculated according to equation (1) above. The total effect of the logical object having the non-ideal data quality attribute on the selected logical object may be calculated according to equation (2) above. The qualitative value of the effect may then be reported to the operator. The analysis module 82 may select a further one of the logical objects from the selected logical objects until all selected logical objects have been considered.

By way of further example, the systems and methods disclosed herein may be used to determine the effect of various non-idealities within the FCM of FIG. 7.

In the first example, the logical node TVTR1 is assumed to have a non-ideality associated therewith. The non-ideality may be a non-ideal health or a non-ideal data quality attribute, such as a questionable measurement. In this example, it is desired to investigate the impact of the non-ideality on the IHMI (at the operator desk). For this purpose, the paths from the logical node TVTR1 to the logical node IHMI need to be investigated. There are five paths from TVTR1 to IHMI, namely:

TVTR1—MMXU—IHMI
TVTR1—PTOV—AVCO—GAPC—IHMI
TVTR1—CPOW—GAPC—IHMI
TVTR1—MMXN—GAPC—IHMI
TVTR1—PDIS—RREC—IHMI

The total effect of the non-ideality of the TVTR1 on the IHMI is determined as:

$$\max\{\min(V\!.H,\ V\!.H) + \min(H,\ M,\ H,\ M) + \min(L,\ H,\ M) + \min(H,\ M,\ M) + \min(V\!.H,\ V\!.H,\ V\!.H)\} = \text{Very High}$$

Accordingly, the data provided by the TVTR1 has a very high impact on the operator interface, and the non-ideality of the logical node needs to be taken into account before employing it in any decision making process.

In the second example, the logical node XCBR is assumed to have a non-ideality associated therewith. The non-ideality may be a non-ideal health or a non-ideal data quality attribute such as a questionable status. In this example, it is desired to investigate the impact of the non-ideality on the performance of the generic GAPC control function. The paths from the XCBR to GAPC are:

XCBR—GAPC
XCBR—CILO (Bay)—CILO (Station)—GAPC
XCBR—CSWI—CILO (Bay)—CILO (St.)—GAPC The total effect of the circuit breaker with the non-ideality on the GAPC function is therefore:

$$\text{Max}\{\min(M) + \min(V\!.H,\ M,\ M) + \min(V\!.H,\ V\!.H,\ M,\ M)\} = \text{Medium}$$

Hence, the non-ideality of the circuit breaker does not have a major impact on the performance of the GAPC control function, but still needs to be taken into account.

In the third example, the logical node YLTC is assumed to have a non-ideality associated therewith. The non-ideality may be a non-ideal health or a non-ideal data quality attribute such as an outdated position. In this example, it is desired to see the impact of the non-ideality on the accuracy of the control function ATCC which is dependent on this device. The two paths from YLTC to the logical node GAPC are:

YLTC—ATCC
YLTC—AVCO—GAPC—ATCC

The total effect is therefore:

$$\text{Max}\{\min(V\!.H) + \min(H,\ H,\ V\!.H)\} = \text{Very High}$$

which as expected, indicates that the non-ideality needs to be taken into account immediately.

In some examples, the logical object map developing module 78 discussed above in connection with the system 76 may be configured to automatically generate a logical map for the automated system. For example, the logical object map, which may be an FCM, and the dependencies between the logical objects can be automatically determined or built based on data files that are configured in compliance with a particular protocol for a given automation system and/or automated system. In the context of an SA system that is in compliance with IEC 61850, the Substation Configuration Language file (SCL file) may be used to build or develop an FCM for the SA system. The SCL file is an XML file that includes descriptions of the SA system and device configuration in a format defined in IEC 61850-6, the complete disclosure of which is incorporated by reference for all purposes.

When considering the automated generation of an FCM, the FCM may include (1) the identified or determined logical objects present in the system under study, (2) the relation between the logical objects in terms of data dependencies, (3) the direction of the dependencies between two given logical objects, and (4) the weight of a relation between two directly dependent logical objects. When studying a given system, the logical objects may only be considered if they require and/or provide any data from or to the rest of the system, namely, to other logical objects in the system. The relation between the logical objects in terms of data dependencies refers to which logical object depends on the data provided by what other logical object(s). The weights of relations may be defined in approximate fuzzy terms, as generally discussed above.

The logical objects or nodes present in the system under study may be identified or determined from the DataType-Templates section of an IEC 61850 SCL file. The DataType-Templates section identifies the different logical nodes present on the system.

The relation between the logical objects or nodes in terms of data dependencies may be determined from an IEC 61850 SCL file. In particular, the IED section identifies the data required by a logical node through the Inputs subsection, while the DataSet subsection identifies the data that are produced/modified by a logical node. The dependencies between the logical devices may be determined by matching the different Inputs and DataSet subsections.

The direction of the dependencies between two given logical objects may be determined from the above-mentioned sections of the IEC 61850 SCL file.

Several options may be considered to determine the weight of a relation between two directly dependent logical objects as such information is not included in the existing format of the IEC 61850 SCL file.

First, an extension may be added to an IEC 61850 SCL file. Such an extension could be made in various ways. For example, the private section of the SCL file can be used to give the weight of each data association/relation within an SA system. Alternatively, an external file/repository, distinct from the SCL file, can play this role so that the weight values remain confidential and are not public. Another way may be to describe the importance of the data in the input section of the logical node instead of identifying each relationship. The type of weight used on each relationship may depend on the engine analyzing the FCM. For example, four discrete values can be assigned such as low, medium, high and very high. This information could be provided to the module from an external database.

Second, an expert system could be used. In particular, expert rules may be derived to automatically assign weights to the association links. For example, main data provided to a protection function could be marked as high, whereas data provided to a monitoring function could be marked as medium priority. In some examples, if a protection/control function uses several different data points to make a decision, the dependency on each data object would be lower compared to the case where the function uses only one data object for decision making.

Third, expert knowledge could be used. In particular, the weights of the links may be assigned based on expert knowledge once the structure of the FCM is built. Although use of expert knowledge may be time-consuming, it would be a one-time calculation because, once the FCM structure is finalized, the weights would not need to be changed.

A nonexclusive illustrative example of a method for generating or building an FCM may include reading a data file, which may be an IEC 61850 SCL file, that has information descriptive of the plurality of interconnected logical objects and the interdependence thereof. The FCM may be built based on the data file by determining logical nodes from the information in the data file, extrapolating data dependencies from the information in the data file, identifying relationships between the logical nodes based on the data dependencies, identifying directions of the relationships based on the data dependencies, and determining a weight for each of the direct relationships. In some examples, at least some of the relationships may be a direct relationship between a pair of logical nodes.

Figure 9:
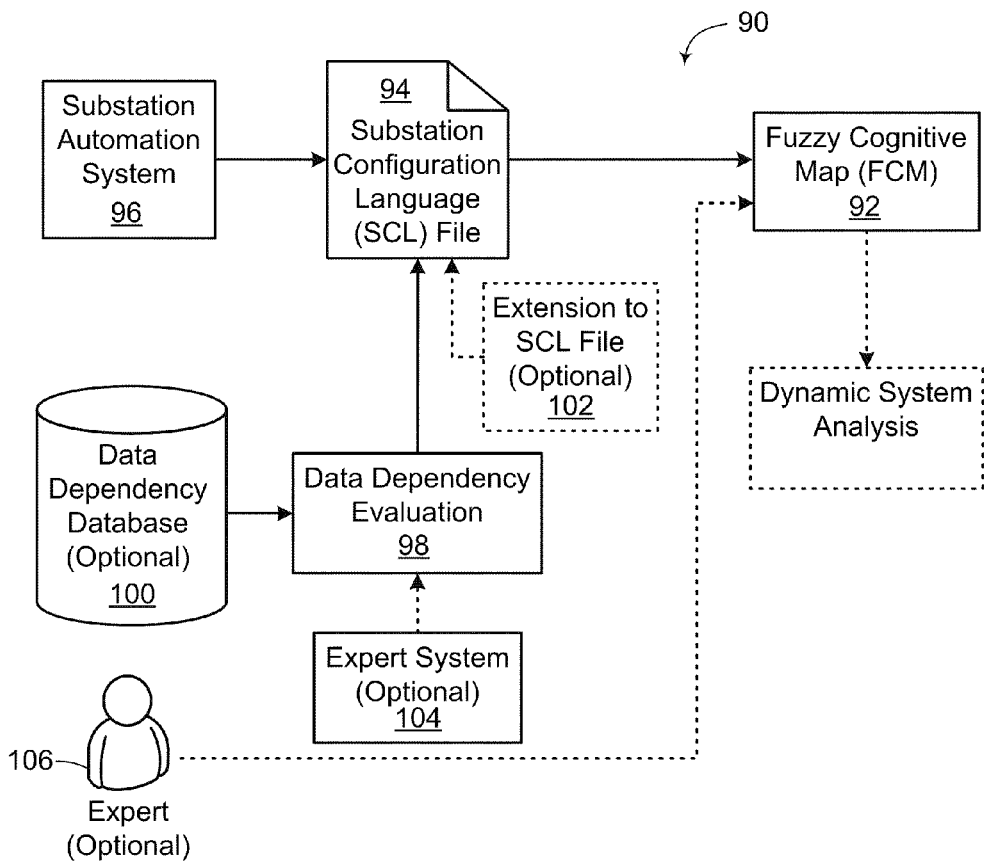
FIG. 9 is a schematic representation of a nonexclusive illustrative example of a system for generating a fuzzy cognitive map (FCM) from a Substation Configuration Language (SCL) File.

A nonexclusive illustrative example of a system for generating an FCM from an IEC 61850 SCL file is schematically illustrated in FIG. 9 at 90. The system 90 may generate the FCM 92, which may be used in a dynamic system analysis, from an SCL file 94 received from the substation automation system 96. The FCM may be generated using data dependency evaluation 98. In some examples, the system may include or rely on one or more of a data dependency database 100, an extension 102 added to the SCL file, an expert system 104, or knowledge from a human expert 106, who may manually derive some or all of the FCM. The expert system 104 may be an intelligent system that builds heuristic rules from which the interdependency of the logical nodes may be automatically determined.

The disclosed methods and systems may be embodied as or take the form of the methods and systems previously described, as well as of a computer readable medium, which may be tangible or intangible, having computer-readable instructions stored thereon which, when executed by a processor, carry out operation of the disclosed methods and systems. The computer-readable medium may be any medium that can contain, store, communicate, propagate, or transport the program instruction for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium may include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the disclosed methods and systems may be written in any suitable programming language provided it allows achieving the previously described technical results.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A method for operating an electrical power automation system that includes a plurality of interconnected logical objects, the method comprising:
evaluating, with a computer of the electrical power automation system, a data file associated with the automation system to identify information descriptive of the plurality of interconnected logical objects, wherein the plurality of interconnected logical objects include a control device, a relay device, a measurement device, and a protection device;
responsive to evaluating the data file to identify the information, automatically generating, with the computer, a fuzzy cognitive map that models an interdependence of the plurality of interconnected logical objects upon one another based upon the information, wherein the fuzzy cognitive map includes a plurality of nodes each representing one of the plurality of interconnected logical objects and a plurality of links each representing an interdependence between two logical objects of the plurality of interconnected logical objects,
where respective weights are automatically generated for the plurality of links based upon data extracted from an extension of the data file that comprises a plurality of entries each storing a value corresponding to a weight of a link, while generating the fuzzy cognitive map to indicate a degree of interdependence such that a first interdependence between a first logical object and a second logical object is greater than a second interdependence between a third logical object and a fourth logical object,
where the first logical object and the second logical object are linked to one another by a first link having a first weight and the third logical object and the fourth logical object are linked to one another by a second link having a second weight, and where the first weight is greater than the second weight;
identifying, with the computer, a non-ideality for a node, the non-ideality associated with at least one of the plurality of interconnected logical objects; and
selecting, with the computer, the at least one of the plurality of interconnected logical objects associated with the non-ideality and selecting at least one other of the plurality of interconnected logical objects and calculating, with the computer, an indirect effect and a total effect on the at least one other of the plurality of interconnected logical objects and reporting a qualitative value of the indirect effect and the total effect to an operator of the computer.

2. The method of claim 1, wherein respective weights are automatically determined for the plurality of links based upon one or more heuristic rules.

3. The method of claim 1, wherein the non-ideality is a non-ideal health status for one or more of the plurality of interconnected logical objects.

4. The method of claim 3, wherein the non-ideality relates to an operational state of the first device.

5. The method of claim 1, wherein the first weight is based upon a first function performed relative to the first logical object and the second logical object and the second weight is based upon a second function, different than the first function, performed relative to the third logical object and the fourth logical object.

6. The method of claim 1, wherein the first weight is based upon a first number of links corresponding to a first function performed relative to the first logical object and the second logical object and the second weight is based upon a second number of links corresponding to a second function, different than the first function, performed relative to the third logical object and the fourth logical object.

7. The method of claim 1, wherein the non-ideality is a non-ideal quality of data for one or more of the plurality of interconnected logical objects.

8. The method of claim 7, wherein the non-ideal quality indicates that the data is invalid.

9. The method of claim 7, wherein the non-ideal quality indicates that the data has a questionable value.

10. The method of claim 1, wherein the automation system is a substation automation system, and each of the plurality of interconnected logical objects corresponds to a control, a protection, monitoring, or a measurement element within a sub station.

11. The method of claim 1, wherein the automation system is a substation automation system, and the data file is a Substation Configuration Language (SCL) file.

12. The method of claim 1, comprising utilizing an expert system to determine the first weight.

13. The method of claim 12, wherein the automation system is a substation automation system, and the data file is an International Electrotechnical Commission (IEC) 61850 Substation Configuration Language (SCL) file.

14. An operating system for an electrical power automation system, comprising:
a plurality of interconnected logical objects, wherein the plurality of interconnected logical objects include a control device, a relay device, a measurement device, and a protection device that correspond to first, second, third and fourth ones of the interconnected logical objects;
a computer linked to the plurality of interconnected logical objects; and
a computer readable storage medium containing instructions configured to cause the computer to monitor operation of the automation system upon execution of the instructions, the instructions comprising:
instructions to evaluate a data file associated with the automation system to identify information descriptive of the plurality of interconnected logical objects;
instructions to automatically generate a fuzzy cognitive map that models an interdependence of the plurality of interconnected logical objects upon one another based upon the information, wherein the fuzzy cognitive map includes a plurality of nodes each representing one of the plurality of interconnected logical objects and a plurality of links each representing an interdependence between two logical objects of the plurality of interconnected logical objects, where respective links are weighted based upon data extracted from an external repository distinct from the data file that comprises a plurality of entries each storing a value corresponding to a weight of a link to indicate a degree of interdependence such that a first interdependence between a first logical object and a second logical object is greater than a second interdependence between a third logical object and a fourth logical object, where the first logical object and the second logical object are linked to one another by a first link having a first weight and the third logical object and the fourth logical object are linked to one another by a second link having a second weight, where the first weight is greater than the second weight, and where the first weight is based upon a first function performed relative to the first logical object and the second logical object and the second weight is based upon a second function, different than the first function, performed relative to the third logical object and the fourth logical object, of a protection function, a monitoring function, an acquisition function, a supervision function, a control function, a tap changing function, an interlocking function and a reclosing function;

instructions to identify a non-ideality for a node, the non-ideality associated with at least one of the plurality of interconnected logical objects; and instructions to select, in response to an operator input, the at least one of the plurality of interconnected logical objects associated with the non-ideality and at least one other of the plurality of interconnected logical objects and, in response to the selection, calculate an indirect effect and a total effect on the at least one other of the plurality of interconnected logical objects and reporting a qualitative value of the indirect effect and the total effect to an operator of the computer.

15. The monitoring system of claim 14, wherein at least one of the first function or the second function comprises the protection function, the protection function comprising at least one of a line distance protection function, a tap changing protection function or an overvoltage protection function.

16. The monitoring system of claim 14, wherein at least one of the first function or the second function comprises the monitoring function.

17. The monitoring system of claim 14, wherein at least one of the first function or the second function comprises the acquisition function.

18. The monitoring system of claim 14, wherein at least one of the first function or the second function comprises the supervision function, the supervision function configured to detect abnormal behavior.

19. The monitoring system of claim 14, wherein at least one of the first function or the second function comprises the control function.

20. A method for operating a substation automation system that includes a plurality of interconnected logical objects, the method comprising:

evaluating, with a computer of the electrical power automation system, a data file associated with the substation automation system to identify information descriptive of the plurality of interconnected logical objects, wherein the plurality of interconnected logical objects include a control device, a relay device, a measurement device, and a protection device that correspond to first, second, third and fourth ones of the interconnected logical objects;

responsive to evaluating the data file to identify the information, automatically generating, with the computer, a fuzzy cognitive map that models an interdependence of the plurality of interconnected logical objects upon one another based upon the information, wherein the fuzzy cognitive map includes a plurality of nodes each representing one of the plurality of interconnected logical objects and a plurality of links each representing an interdependence between two logical objects of the plurality of interconnected logical objects, where respective links are weighted by an expert system to indicate a degree of interdependence such that a first interdependence between a first logical object and a second logical object is greater than a second interdependence between a third logical object and a fourth logical object, where the first logical object and the second logical object are linked to one another by a first link having a first weight and the third logical object and the fourth logical object are linked to one another by a second link having a second weight, where the first weight is greater than the second weight responsive to a determination that: a first number of links exist between one or more first logical objects and a first function associated with the first logical object;

a second number of links exist between one or more second logical objects and a second function, different than the first function, associated with the third logical object, where the first function is dependent on the one or more first logical objects and the second function is dependent on the one or more second logical objects; and a dependency of the second function on each of the one or more second logical objects is greater than a dependency of the first function on each of the one or more first logical objects based upon a determination that the second number of links is greater than the first number of links;

identifying, with the computer, a non-ideality for a node, the non-ideality associated with at least one of the plurality of interconnected logical objects; and selecting, with the computer, the at least one of the plurality of interconnected logical objects associated with the non-ideality and selecting at least one other of the plurality of interconnected logical objects and calculating, with the computer, an indirect effect and a total effect on the at least one other of the plurality of interconnected logical objects and reporting a qualitative value of the indirect effect and the total effect to an operator of the computer.

21. The monitoring system of claim 14, wherein at least one of the first function or the second function comprises the tap changing function.

22. The monitoring system of claim 14, wherein at least one of the first function or the second function comprises the interlocking function.

23. The monitoring system of claim 14, wherein at least one of the first function or the second function comprises the reclosing function.

* * * * *